(12) United States Patent
Bartelink et al.

(10) Patent No.: US 8,436,063 B2
(45) Date of Patent: *May 7, 2013

(54) POLYMER POLYOLS AND POLYMER DISPERSIONS MADE FROM VEGETABLE OIL-BASED HYDROXYL-CONTAINING MATERIALS

(75) Inventors: Camiel F. Bartelink, Terneuzen (NL); Hanno R. Van der Wal, Hoek (NL)

(73) Assignee: Dow Global Technologies LLC, Midland, MI (US)

( * ) Notice: Subject to any disclaimer, the term of this patent is extended or adjusted under 35 U.S.C. 154(b) by 887 days.

This patent is subject to a terminal disclaimer.

(21) Appl. No.: 11/663,529

(22) PCT Filed: Oct. 24, 2005

(86) PCT No.: PCT/US2005/038214
§ 371 (c)(1),
(2), (4) Date: Mar. 22, 2007

(87) PCT Pub. No.: WO2006/065345
PCT Pub. Date: Jun. 22, 2006

(65) Prior Publication Data
US 2009/0197984 A1 Aug. 6, 2009

Related U.S. Application Data

(60) Provisional application No. 60/622,218, filed on Oct. 25, 2004.

(51) Int. Cl.
| | | |
|---|---|---|
| C08G 18/42 | (2006.01) | |
| C08G 18/46 | (2006.01) | |
| C08J 9/06 | (2006.01) | |
| C08J 9/12 | (2006.01) | |
| C08L 75/06 | (2006.01) | |

(52) U.S. Cl.
USPC ............ 521/137; 252/182.24; 252/182.28; 524/300; 524/306; 524/311; 524/315; 524/773; 525/452; 525/453; 525/458; 525/459; 525/460

(58) Field of Classification Search ............ 521/137; 524/300, 306, 311, 315, 543, 773, 308; 525/123, 525/455, 452, 453, 458, 459, 460; 252/182.28, 252/182.29, 182.24
See application file for complete search history.

(56) References Cited

U.S. PATENT DOCUMENTS

| | | |
|---|---|---|
| 2,866,744 A | 12/1958 | Askey et al. |
| 3,278,457 A | 10/1966 | Milgrom |
| 3,278,458 A | 10/1966 | Belner |
| 3,278,459 A | 10/1966 | Herold |
| 3,325,421 A | 6/1967 | Muller |
| 3,404,109 A | 10/1968 | Milgrom |
| 3,427,256 A | 2/1969 | Milgrom |
| 3,427,334 A | 2/1969 | Belner |
| 3,427,335 A | 2/1969 | Herold |
| 3,755,212 A | 8/1973 | Dunlap et al. |
| 3,821,130 A | 6/1974 | Barron et al. |
| 3,849,156 A | 11/1974 | Marlin et al. |
| 3,931,450 A | 1/1976 | Patton, Jr. et al. |
| 4,042,537 A | 8/1977 | Dahm et al. |
| 4,089,835 A | 5/1978 | Konig et al. |
| 4,242,249 A | 12/1980 | Van Cleve et al. |
| 4,293,470 A | 10/1981 | Cuscurida |
| 4,296,213 A | 10/1981 | Cuscurida et al. |
| 4,350,780 A | 9/1982 | Van Cleve et al. |
| 4,374,209 A | 2/1983 | Rowlands et al. |
| 4,390,645 A | 6/1983 | Hoffman et al. |
| 4,423,162 A | 12/1983 | Peerman et al. |
| 4,452,923 A | 6/1984 | Carroll et al. |
| 4,460,715 A | 7/1984 | Hoffman et al. |
| 4,496,487 A | 1/1985 | Peerman et al. |
| 4,543,369 A | 9/1985 | Peerman et al. |
| 4,581,418 A * | 4/1986 | Serratelli et al. ............... 525/404 |
| 4,633,021 A | 12/1986 | Hanes |
| 4,731,486 A | 3/1988 | Abatjoglou et al. |
| 4,745,153 A | 5/1988 | Hoffman |
| 4,831,076 A | 5/1989 | Lidy et al. |
| 4,843,054 A | 6/1989 | Harper |
| 5,145,879 A | 9/1992 | Budnik et al. |
| 5,300,535 A | 4/1994 | Takeyasu et al. |
| 5,451,631 A | 9/1995 | Guo |
| 5,470,813 A | 11/1995 | Le-Khac |
| 5,494,957 A | 2/1996 | Moore et al. |
| 5,552,486 A | 9/1996 | Guo et al. |
| 5,627,120 A | 5/1997 | Le-Khac |
| 5,648,559 A | 7/1997 | Hager |
| 5,786,514 A | 7/1998 | Shen et al. |
| 5,811,566 A | 9/1998 | Watabe et al. |
| 5,854,386 A | 12/1998 | Shen et al. |
| 5,856,369 A | 1/1999 | Jorgenson et al. |
| 5,908,701 A | 6/1999 | Jennings et al. |
| 5,990,185 A * | 11/1999 | Fogg ............................ 521/112 |

(Continued)

FOREIGN PATENT DOCUMENTS

| | | |
|---|---|---|
| EP | 0397036 | 11/1990 |
| EP | 0712884 | 5/1996 |
| EP | 0763555 | 3/1997 |
| EP | 1112243 | 7/2001 |
| JP | HEI 5-163342 | 6/1993 |
| WO | WO-94/12553 | 6/1994 |
| WO | WO 94/12553 | * 6/1994 |
| WO | WO-98/52988 | 11/1998 |
| WO | WO-2004/020497 | 3/2004 |
| WO | WO-2004/096744 | 11/2004 |
| WO | WO-2004/096882 | 11/2004 |
| WO | WO-2004/096883 | 11/2004 |

(Continued)

*Primary Examiner* — Rabon Sergent

(74) *Attorney, Agent, or Firm* — Whyte Hirschboeck Dudek S.C.

(57) ABSTRACT

Polymer polyols and dispersions are prepared by polymerizing certain starting materials in a continuous phase. The continuous phase includes a polyol containing hydroxylmethyl groups, which is derived from a fatty acid. The dispersed phase may be, for example, a vinyl polymer, a polyurea or a polyurethane-urea.

10 Claims, No Drawings

U.S. PATENT DOCUMENTS

| | | |
|---|---|---|
| 6,018,017 A | 1/2000 | Le-Khac |
| 6,075,064 A | 6/2000 | Muller et al. |
| 6,255,537 B1 | 7/2001 | Hayashi et al. |
| 6,348,514 B1 * | 2/2002 | Calabrese et al. ............ 521/130 |
| 6,355,845 B1 | 3/2002 | Clement et al. |
| 6,372,810 B2 | 4/2002 | Kazmierski et al. |
| 6,429,342 B1 | 8/2002 | Clement et al. |
| 6,552,163 B1 | 4/2003 | Clement et al. |
| 2003/0225244 A1 | 12/2003 | Nobori et al. |

FOREIGN PATENT DOCUMENTS

| | | |
|---|---|---|
| WO | WO-2006/047431 | 5/2006 |
| WO | WO-2006/047432 | 5/2006 |
| WO | WO-2006/047433 | 5/2006 |
| WO | WO-2006/047434 | 5/2006 |

\* cited by examiner

POLYMER POLYOLS AND POLYMER DISPERSIONS MADE FROM VEGETABLE OIL-BASED HYDROXYL-CONTAINING MATERIALS

This application claims benefit of U.S. Provisional Application No. 60/622,218, filed Oct. 25, 2004.

The invention relates to dispersions of polymer particles in a hydroxyl-containing material. Dispersions of this type are commonly known as polymer polyols or copolymer polyols.

Polyurethane foams are produced by the reaction of polyisocyanates and polyols. The first large scale commercial production of polyurethanes arose using polyester polyols from the ester condensation reaction of diols or polyols and dicarboxylic acids to make flexible foams. The polyester polyols were supplanted by polyether polyols because of their lower cost and the ability to make a wide range of polyols. Polyethers are made by polymerizing epoxides (oxiranes) derived from petroleum feedstocks in the presence of initiator compounds that contain active hydrogen starting compounds, such as low molecular weight polyols and polyamines. Rigid polyurethane foams have been made with castor oil or castor oil byproducts.

Attempts have been made to make polyols from vegetable or renewable feedstocks such as those disclosed by Peerman et al. in U.S. Pat. Nos. 4,423,162, 4,496,487 and 4,543,369. Peerman et al. describe hydroformylating and reducing esters of fatty acids as are obtained from vegetable oils, and forming esters of the resulting hydroxylated materials with a polyol or polyamine. However, Peerman et al., specifically describe problems of gelling, which he avoided by using no greater than 1 mole of the hydroxymethylated material per equivalent of polyol or polyamine. Consequently, Peerman et al.'s esters are low equivalent weight materials that have been shown to be useful only in making crosslinked rigid polyurethanes. In order to improve load-bearing and other foam properties, co-called polymer polyol products have been developed. A common type of polymer polyol is a dispersion of vinyl polymer particles in a polyol. These materials are described in a large number of references, of which U.S. Pat. Nos. 4,242,249, 4,350,780, 4,390,645, 4,460,715, 4,745,153, 4,381,076 and 5,494,957 and WO 98/52988 are examples. Other common types are so-called "PHD" polyols, which are dispersions of polyurea particles, as described in U.S. Pat. Nos. 3,325,421, 4,042,537 and 4,089,835; and so-called "PIPA" (polyisocyanate polyaddition) polyols, which are dispersions of polyurethane-urea particles, as described in U.S. Pat. Nos. 4,293,470, 4,296,213, 4,374,209 and 4,452,923. These polymer polyol products are then used alone or as part of a polyol mixture in preparing flexible polyurethane foam. Key attributes of polymer polyols are solids level, dispersion stability, viscosity and filterability. It is usually desirable to produce the polymer polyol with as high a solids content as possible, as this reduces manufacturing costs and allows the polymer polyol to be diluted with conventional polyols to obtain any desirable lower solids content. Stability and filterability are important in storing and transporting the polymer polyol, and to ensure that it can be used to make consistent quality foam products. Low to moderate viscosities are important for efficient foam processing and consistent meterability. It is often difficult to obtain a good balance of these properties. In particular, stability and viscosity depend greatly on the attributes of the particular polyol and dispersed polymer phase, as well as the selection of a proper stabilizer material.

It is generally desirable to replace all or part of the conventional petroleum-based polyols with an alternative polyol that is based on a renewable feedstock. Conventional polyol prices tend to fluctuate with crude oil pricing, which is becoming increasingly volatile due to dwindling proven reserves, increased global demand and an uncertain geopolitical climate. Further, many countries do not have domestic oil reserves, but have large agricultural industries that could produce vegetable oil feedstocks for making alternative polyols, if those polyols perform well from both technological and economical standpoints. Accordingly, it is desirable to produce a polymer polyol product in which at least some of the conventional polyol materials are replaced with a material derived from a renewable material such as a vegetable oil or animal fat-based.

This invention is a polymer polyol having a polyol continuous phase and dispersed polymer particles, wherein the polyol continuous phase includes at least one hydroxymethyl-containing polyester polyol derived from a fatty acid or fatty acid ester. The polyester polyol is conveniently prepared by reacting a hydroxymethyl group-containing fatty acid having from 12 to 26 carbon atoms, or an ester of such a hydroxymethyl group containing fatty acid, with an alcohol or amine initiator compound having an average of at least 1 hydroxyl, primary amine and/or secondary amine group per molecule, such that the hydroxymethyl-containing polyester polyol contains an average of at least 1.3 repeating units derived from the hydroxymethyl-group-containing fatty acid or ester per total number of hydroxyl, primary amine and secondary amine groups in the initiator compound, and the hydroxymethyl-containing polyester polyol has an equivalent weight of at least 400 up to 15,000.

Surprisingly, stable, low viscosity polymer polyols can be prepared in polyol continuous phases that contain the hydroxymethyl-containing polyester polyol. The polymer polyols are useful in a wide range of polyurethane applications, such as flexible slabstock foam, high resiliency flexible slabstock foam, molded foam, and various elastomer and microcellular elastomer applications.

This invention is also a dispersion of polymer particles in a continuous phase that contains a hydroxymethyl group-containing fatty acid or alkyl or inertly substituted alkyl ester thereof, the hydroxymethyl group-containing fatty acid having from 12 to 26 carbon atoms. It has been found that high solids polymer polyol compositions are readily prepared at good viscosities and good fiterability. This dispersion can be used directly to make a polyurethane. However, in many cases the hydroxymethyl group-containing fatty acid or ester contains a high proportion of molecules that have hydroxyl groups or only one hydroxyl group. In such a case, the dispersion of the invention is preferably blended with another material having a higher functionality (i.e., a higher number of isocyanate-reactive groups/molecule) to produce a polyol mixture suitable for preparing a polyurethane.

Surprisingly, the hydroxylmethyl group-containing fatty acid or ester can react with free hydroxyl groups provided by other polyol materials in the mixture, during the step of forming the polyurethane foam or afterward, to form ester groups therewith. Although the presence of monofunctional alcohols would normally be expected to create unreactive chain ends that limit the molecular weight and crosslink density of the polymer, the ability of the fatty acid or ester to react with free hydroxyl groups from other polyol materials provides an alternative mechanism by which these monofunctional materials can react to build molecular weight and crosslink density in the polyurethane polymer.

The polymer polyol of the invention is conveniently prepared by the in situ formulation of polymer particles in a continuous polyol phase. The particles may be, for example, a polymer of one or more vinyl monomers, or may be polyurea or polyurea-urethane particles. The continuous polyol phase includes at least one hydroxymethyl-containing polyester polyol.

To produce a dispersion of a vinyl particle, one or more ethylenically unsaturated monomers and at least one stabilizer, both as described more fully below, are dispersed in a continuous polyol phase. In general, the polymerization is conducted by forming an agitated mixture of the monomer in the continuous phase, and subjecting the mixture to conditions sufficient to polymerize the monomer to form dispersed polymer particles. Conditions suitable for conducting such polymerizations are well known and described, for example, in U.S. Pat. Nos. 4,242,249, 4,350,780, 4,390,645, 4,460,715, 4,745,153, 4,381,076, 5,494,957 and WO 98/52988.

Suitable ethylenically unsaturated monomers are those which are polymerizable at a temperature at which the continuous phase does not significantly degrade (such as at temperature of below 150° C., especially below 130° C.), and which have low solubility in the continuous phase when polymerized. Examples of suitable monomers include aliphatic conjugated dienes such as butadiene; monovinylidene aromatics such as styrene, α-methyl styrene, vinyl naphthalene and other inertly substituted styrenes; α,β-ethylenically unsaturated carboxylic acids and esters such as acrylic acid, methacrylic acid, methyl acrylate, methyl methacrylate, 2-hydroxyethyl acrylate and 2-hydroxyethyl methacrylate; α,β-ethylenically unsaturated nitrites such as acrylonitrile; acrylamide; vinyl esters such as vinyl acetate; vinyl ethers; vinyl ketones; vinyl and vinylidene halides; and the like. Of these, the monovinyl aromatics and α,β-unsaturated nitrites are preferred. Styrene and acrylonitrile are preferred monomers. Mixtures of styrene and acrylonitrile are particularly preferred, especially mixtures in which styrene constitutes from about 25 to 95%, especially from about 50 to 75%, of the weight of the monomer mixture.

In the first aspect of the invention, the continuous phase includes a polyol or mixture of polyols. At least one of the polyols is a hydroxymethyl-containing polyester polyol has an average of at least 1, preferably at least 2, more preferably at least 2.5, to about 12, more preferably to about 6, even more preferably to about 5, hydroxyl, primary and secondary amine groups combined per molecule. The hydroxymethyl-containing polyester polyol has an equivalent weight of at least 400, such as at least about 600, at least about 650, at least about 700, or at least about 725, to about 15,000, such as to about 6000, to about 3500, up to about 1700, up to about 1300, or to about 1000. Equivalent weight is equal to the number average molecular weight of the molecule divided by the combined number of hydroxyl, primary amine and secondary amine groups.

Hydroxymethyl-containing polyester polyols of this type are described in detail in WO 04/096882 and WO 04/096883. The hydroxymethyl group-containing polyester polyol is conveniently prepared by reacting a hydroxymethyl group-containing fatty acid having from 12 to 26 carbon atoms, or an ester of such a fatty acid, with a polyol, hydroxylamine or polyamine initiator compound having an average of at least 1, especially at least 2, hydroxyl, primary amine and/or secondary amine groups/molecule. Proportions of starting materials and reaction conditions are selected such that the resulting hydroxymethyl-containing polyester polyol contains an average of at least 1.3 repeating units derived from the hydroxmethyl-group containing fatty acid or ester thereof for each hydroxyl, primary amine and secondary amine group in the initiator compound, and the hydroxymethyl-containing polyester polyol has an equivalent weight of at least 400 up to about 15,000.

The hydroxymethyl-containing polyester polyol advantageously is a mixture of compounds having the following average structure:

wherein R is the residue of an initiator compound having z hydroxyl and/or primary or secondary amine groups, where z is at least two; each X is independently —O—, —NH— or —NR'— in which R' is an inertly substituted alkyl aryl, cycloalkyl, or aralkyl group, p is a number from 1 to z representing the average number of [X—Z] groups per hydroxymethyl-containing polyester polyol molecule, Z is a linear or branched chain containing one or more A groups, provided that the average number of A groups per molecule is ≧1.3 times z, and each A is independently selected from the group consisting of A1, A2, A3, A4 and A5, provided that at least some A groups are A1, A2 or A3. A1 is:

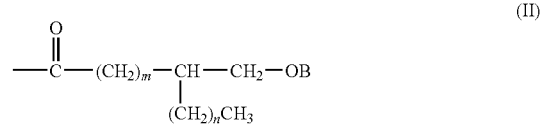

wherein B is H or a covalent bond to a carbonyl carbon atom of another A group; m is number greater than 3, n is greater than or equal to zero and m+n is from 8 to 22, especially from 11 to 19. A2 is:

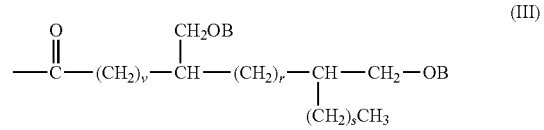

wherein B is as before, v is a number greater than 3, r and s are each numbers greater than or equal to zero with v+r+s being from 6 to 20, especially 10 to 18. A3 is:

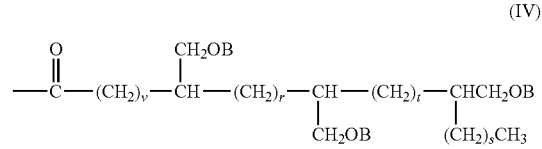

wherein B, v, each r and s are as defined before, t is a number greater than or equal to zero, and the sum of v, r, s and t is from 5 to 18, especially from 10 to 18. A4 is

where w is from 10-24, and A5 is

where R' is a linear or branched alkyl group that is substituted with at least one cyclic ether group and optionally one or more hydroxyl groups or other ether groups. The cyclic ether group may be saturated or unsaturated and may contain other inert substitution. The hydroxyl groups may be on the alkyl chain or on the cyclic ether group, or both. The alkyl group may include a second terminal —C(O) or —C(O)O— group through which it may bond to another initiator molecule. A5 groups in general are lactols, lactones, saturated or unsaturated cyclic ethers or dimers that are formed as impurities during the manufacture of the hydroxylmethyl-group containing fatty acid or ester. A5 groups may contain 12-50 carbon atoms.

In formula I, z is preferably from 1 to 8, more preferably from 2 to 6, even more preferably from 2 to 5 and especially from about 3 to 5. Each X is preferably —O—. The total average number of A groups per hydroxymethylated polyol molecule is preferably at least 1.5 times the value of z, such from about 1.5 to about 10 times the value of z, about 2 to about 10 times the value of z or from about 2 to about 5 times the value of z.

A is preferably A1, a mixture of A1 and A2, a mixture of A1 and A4, a mixture of A1, A2 and A4, a mixture of A1, A2 and A3, or a mixture of A1, A2, A3 and A4, in each case optionally containing a quantity of A5. Mixtures of A1 and A2 preferably contain A1 and A2 groups in a mole ratio of 10:90 to 95:5, particularly from 60:40 to 90:10. Mixtures of A1 and A4 preferably contain A1 and A4 groups in a mole ratio of 99.9:0.1 to 70:30, especially in a ratio of from 99.9:0.1 to 85:15. Mixtures of A1, A2 and A4 preferably contain from about 10 to 95 mole percent A1 groups, 5 to 90 percent A2 groups and up to about 30 percent A4 groups. More preferred mixtures of A1, A2 and A4 contain about 25-70, mole-% A1 groups, 15-40% A2 groups and up to 30% A4 groups. Mixtures of A1, A2 and A3 preferably contain from about 30-80 mole-% A1, from 10-60% A2 and from 0.1 to 10% A3 groups. Mixtures of A1, A2, A3 and A4 groups preferably contain from 20 to 50 mole percent A1, 1 to about 65 percent A2, from 0.1 to about 10 percent A3 and up to 30 percent A4 groups. Especially preferred polyester polyols of the invention contain a mixture of about 20-50% A1 groups, 20-50% A2 groups, 0.5 to 4% A3 groups and 15-30% A4 groups. In all cases, A5 groups advantageously constitute from 0-7%, especially from 0-5%, of all A groups.

Preferred mixtures of A groups conveniently contain an average of about 0.8 to about 1.5 —CH$_2$OH and —CH$_2$OB groups/A group, such as from about 0.9 to about 1.3 —CH$_2$OH and —CH$_2$B groups/A group or from about 0.95 to about 1.2 —CH$_2$O— groups/A group. Such proportions of A groups (1) allow the initiator functionality to mainly determine the functionality of the polyester polyol and (2) tend to form less densely branched polyester polyols.

"Inertly substituted" groups are groups that do not react with an isocyanate groups and which do not otherwise engage in side reactions during the preparation of the hydroxymethyl group-containing polyester polyol. Examples of such inert substituents include as aryl, cycloalkyl, silyl, halogen (especially fluorine, chlorine or bromine), nitro, ether, ester, and the like.

The hydroxymethyl-containing polyester polyol generally contains some unreacted initiator compound, and may contain unreacted hydromethylated fatty acids (or alkyl esters). Initiator compounds often react only monofunctionally or difunctionally with the fatty acids (or esters), and resulting polyester polyol often contains free hydroxyl or amino groups bonded directly to the residue of the initiator compound.

The hydroxymethyl-containing polyester polyol may be alkoxylated, if desired, to introduce polyether chains onto one or more of the hydroxymethyl groups. The hydroxymethyl-containing polyester polyol may also be aminated through reaction with ammonia or a primary amine, followed by hydrogenation, to replace the hydroxyl groups with primary or secondary amine groups. Primary or secondary amine groups can also be introduced by capping the polyester polyol with a diisocyanate, and then converting the terminal isocyanate groups so introduced to amino groups through reaction with water.

The hydroxymethyl-containing polyester polyol may constitute from 10 to 100% by weight of the polyols present in the continuous phase. Preferably, the hydroxymethyl-containing polyester polyol constitutes at least 50%, more preferably at least 70% and even more preferably at least 90% of the weight of the polyols in the continuous phase. If other polyol(s) are present in the continuous phase, such polyol(s) may include polyether polyols and polyester polyols. Polyether: polyols include, for example, polymers of propylene oxide, ethylene oxide, 1,2-butylene oxide, tetramethylene oxide, block and/or random copolymers thereof, and the like. Of particular interest are polypropylene oxide) homopolymers, random copolymers of propylene oxide and ethylene oxide in which the poly(ethylene oxide) content is, for example, from about 1 to about 30% by weight, ethylene oxide-capped polypropylene oxide) polymers and ethylene oxide-capped random copolymers of propylene oxide and ethylene oxide. For slabstock foam applications, such polyethers preferably contain 2-8, especially 2-3, mainly secondary hydroxyl groups per molecule and have an equivalent weight per hydroxyl group of from about 400 to about 3000, especially from about 800 to about 1750. For high resiliency slabstock and molded foam applications, such polyethers preferably contain 2-4, especially 2-3, mainly primary hydroxyl groups per molecule and have an equivalent weight per hydroxyl group of from about 1000 to about 3000, especially from about 1200 to about 2000. The polyether polyols may contain low terminal unsaturation (for example, less that 0.02 meq/g or less than 0.01 meq/g), such as those made using so-called double metal cyanide (DMC) catalysts, as described for example in U.S. Pat. Nos. 3,278,457, 3,278,458, 3,278,459, 3,404,109, 3,427, 256, 3,427,334, 3,427,335, 5,470,813 and 5,627,120. Polyester polyols typically contain about 2 hydroxyl groups per molecule and have an equivalent weight per hydroxyl group of from about 400 to 1500. Suitable polyesters include reaction products of polyols, preferably diols, with polycarboxylic acids or their anhydrides, preferably dicarboxylic acids or dicarboxylic acid anhydrides. Other suitable polyesters include polymers of cyclic lactones such as polycaprolactone.

The additional polyol(s) in the continuous phase may also include one or more low equivalent weight (i.e., less than 400 per isocyanate-reactive group) polyols, polyamines or alkanolamine compounds. Examples of these are materials containing from 3-8, especially from 3-4 hydroxyl, primary amine or secondary amine groups per molecule and having an equivalent weight of from 30 to about 200, especially from 50 to 125. Examples of such materials include diethanol amine, monoethanol amine, triethanol amine, mono- di- or tri(isopropanol)amine, glycerine, trimethylol propane, pentaerythritol, sorbitol and the like. Other suitable materials include those having, two isocyanate-reactive groups per molecule and an equivalent weight per isocyanate-reactive group of less than 400, especially from 31 to 125. The isocyanate reactive groups are preferably hydroxyl, primary aliphatic or aromatic amine, or secondary aliphatic or aromatic amine groups. Representative such materials include ethylene glycol, diethylene glycol, 1,2-propylene glycol, dipropylene glycol, tripropylene glycol, ethylene diamine, phenylene diamine, bis(3-chloro-4-aminophenyl)methane and 2,4-diamino-3,5-diethyl toluene.

The selection and amount of additional(s) polyols in the continuous phase will be selected in conjunction with the intended application. In most instances, any additional polyol in the continuous phase will be a high (i.e., greater than 400) equivalent weight material.

It is generally preferred to use a stabilizer material in preparing the polymer polyol. The use of stabilizers to form a stable polymer polyol product are well known.

One class of stabilizers includes macromers that are compatible the continuous phase polyol(s) (i.e., form a single-phase mixture with the continuous polyol phase at the relative proportions that are present) and which contain polymerizable ethylenic unsaturation. Examples of macromers of this type are described, for example, in U.S. Pat. Nos. 5,494,947, 4,390,645 and 3,931,450. The macromers described in those patents include a polyether portion, which is typically a polymer of propylene oxide and/or ethylene oxide. The polymer is capped with a difunctional capping agent that has a hydroxyl-reactive group and ethylenic unsaturation. Examples of such capping agents include isocyanates, carboxylic acids, carboxylic acid halides, carboxylic acid anhydrides and epoxies having ethylenic unsaturation, and hydroxyl-reactive silanes such as vinyl trimethoxysilane. The macromer may have a number average molecular weight of about 2000-50,000, preferably about 8,000 to about 15,000. The macromer may contain an average of from about 1 to about 7 or more hydroxyl groups/molecule. A macromer of particular interest has a number average molecular weight of about 8,000 to 15,000 and an average of no more than 1.0 hydroxyl group/molecule. Another macromer of particular interest has a number average molecular weight of about 8,000 to 15,000 and an average of 3-7 hydroxyl groups/molecule.

Another suitable class of stabilizers includes polyethers having a molecular weight of about 5,000 to about 50,000, especially about 8,000 to about 15,000, which do not contain added ethylenically polymerizable unsaturation. Stabilizers of this type are described in detail in U.S. Pat. No. 4,831,076. These stabilizers are conveniently prepared by reacting a lower molecular weight polyether polyol with a coupling agent, such as a polyisocyanate, certain silanes having two or more hydroxyl-reactive groups (such as alkoxyl groups), polyepoxides, polycarboxylic acids or the corresponding acid halides and anhydrides, and the like.

Macromers having added ethylenic unsaturation may further contain up to about 10% by weight of a grafted vinyl polymer. The grafted vinyl polymer in these instances tends to form very small dispersed particles about 1 micron or less, especially about 0.5 micron or less, in diameter. These are conveniently prepared by mixing the macromer with isopropanol or other diluent, introducing vinyl monomers, and exposing the mixture to polymerization conditions. Alternatively, this material can be prepared as a first step in the polymer polyol preparation.

The amount of stabilizer that is used will depend on the particular stabilizer and the solids content of the polymer polyol. A suitable range is from about 1 to about 15% of the total weight of the polymer polyol, but it is preferred to use as little of the stabilizer as possible to avoid the associated costs. Generally, more of the stabilizer is needed as the solids level increases. For polymer polyol products having 40% or more solids, it is preferred to use from 2 to 12% by weight of the stabilizer, based on the weight of the polymer polyol. Lower solids level products may require from 1 to 8% by weight of the stabilizer.

The polymer polyol is suitably prepared by combining the monomer(s), stabilizer and continuous phase with agitation to form a mixture, and subjecting the mixture to polymerization conditions. It is possible to add all components to the reaction vessel at the start of the reaction, but it is usually preferred to add monomers and stabilizer to the reaction vessel continuously or in stages during the reaction. This provides better temperature control and often results in better product stability. The continuous or staged addition is suitably performed by adding a small quantity of the continuous polyol phase and stabilizer to the reaction vessel optionally with a seed dispersion to help with particle nucleation, heating to the reaction temperature, and then continuously or intermittently adding the monomer over the period of about 5 minutes to 5 hours, preferably over a period of about 15 minutes to 2 hours. When a macromer-type stabilizer is used, a small amount of the monomers may be polymerized before beginning the main monomer feed. The stabilizer is preferably added in a rate roughly proportional to the rate of growth of the surface area of the dispersed particles.

The polymerization is preferably conducted in the presence of a free radical initiator. The amount of the free radical initiator is selected to provide a commercially reasonable reaction rate while controlling exotherms. A typical amount of free radical initiator is from about 0.1 to about 5, preferably about 0.2 to about 2 and more preferably from about 0.25 to about 1% by weight, based on monomers. The free radical initiator may be all added at the start of the reaction, or it may be added continuously or in stages during the reaction (particularly when the monomer is so added). Examples of suitable free radical initiators include peroxyesters, peroxides, persulfates, perborates, percarbonates, azo compounds and the like. Specific examples of suitable free radical initiators include hydrogen peroxide, t-butyl peroctoate, di(t-butyl) peroxide, lauroyl peroxide, cumene hydroperoxide, t-butyl hydroperoxide, 2,2'-azobis [2,4-dimethyl]pentanenitrile, 2-(t-butylazo)-2-methylbutane nitrile, 2-(t-butylazo)-2-4, dimethylpentanenitrile, azobis(isobutyronitrile), azobis(methylbutyronitrile) (AMBN), tert-amyl peroxy 2-ethyl hexanoate and mixtures of any two or more thereof.

It is also preferred to conduct the polymerization in the presence of a chain transfer agent, as the use of these materials in some cases improves the stability and filterability of the polymer polyol product. Suitable such chain transfer agents are described in U.S. Pat. No. 4,689,354, for example, and include mercaptans such as tertiary dodecyl mercaptan, α-toluenethiol, 1-tetradecanethiol, 2-octanethiol, 1-heptanethio, 1-octanethiol, 2-naphthalenethiol, 1-naphthalenethiol, 1-hexanethiol, ethanethio, and 1-dodecanethiol. Other suitable chain transfer agents include benzyl sulfide, iodoform, iodine, and the like. Suitable amounts of chain transfer agent are from about 0.1 to about 5, especially from about 0.25 to about 2.5 and preferably from about 0.5 to about 1%, based on the weight of the monomers.

Other optional additives may be used to prepare the polymer polyol as well.

After the polymerization is completed, the product is preferably stripped under reduced pressure to remove unreacted monomers and other volatile materials.

The resulting product is a dispersion of particles of the polymerized monomer in the continuous polyol phase. The nominal solids level, expressed herein as the weight of monomers to the total weight of the stabilizer, monomer and polyol(s), can range from 1 to about 65%, and is more typically from about 10 to about 50% by weight. The average particle size is advantageously from about 150 to about 20,000 nanometers, especially from about 200 to about 10,000 nanometers and preferably about 300 to about 6000 nanometers. The viscosity of the polymer polyol is advantageously less than 20,000 cps, is preferably less than 12,000 cps and more preferably less than 8000 cps, as measured at 22° C. by the cone/cup method described in the following examples. It is preferred that 100% of the polymer polyol product will pass through as 30 micron (700 mesh) metal filter in 300 seconds.

Dispersions of polyurethane-urea particles in the hydroxymethyl-containing polyester polyol are conveniently prepared by dissolving a mono- to trialkanolamine having from two to about 8 carbons in each alkanol group in the polyester polyol. Examples of such alkanol amines include such as ethanolamine, diethanolamine, triethanolamine, diisopropanolamine, triisopropanolamine, N-methylisopropanolamine, 2-(2-aminoethoxy)ethanol and hydroxyethylpiperazine. A and di- or polyisocyanate, preferably TDI or MDI is added with stirring. Catalysts are generally unnecessary, although in some cases catalysts such as stannous octoate or dibutyltin dilaurate may be added. The reaction is generally allowed to proceed for a period of from 0.5 to 2 hours, during the course of which a white dispersion is obtained. In general, a portion of the polyol will also react. Suitable such professes are described in U.S. Pat. Nos. 4,293,470, 4,296,213, 4,374,209 and 4,452,923, as well as WO 94/12553.

Dispersions of urea particles are prepared by adding an amine, polyamine, hydrazine or a hydrazide to the hydroxymethyl-containing polyester polyol, and then slowly adding a polyisoycanate. For amines with low solubility, high speed stirring is used to form a fine dispersion prior to adding the polyisocyanate. Suitable amines include hydrazine and ethylenediamine, although other diamines as well as hydrazides, are useful. Methods for making such polyurea dispersions are described in U.S. Pat. Nos. 3,325,421, 4,042,537 and 4,089,835.

A second type of dispersion according to the invention is generally prepared in analogous manner, except that the continuous phase includes a hydroxymethyl group-containing fatty acid or ester thereof, the fatty acid having from 12 to 26 carbon atoms. The ester group is an unsubstituted or inertly substituted alkyl group, especially methyl or ethyl. They can be prepared in a multi-step process from vegetable or animal fats that contain one or more carbon-carbon double bonds in at least one constituent fatty acid chain. Suitable fats include, for example, chicken fat, canola oil, citrus seed oil, cocoa butter, corn oil, cottonseed oil, lard, linseed oil, oat oil, olive oil, palm oil, peanut oil, rapeseed oil, rice bran oil, safflower oil, sesame oil, soybean oil, sunflower oil, or beef tallow.

The vegetable or animal fat is conveniently first subjected to a transesterification reaction with a lower alkanol, especially methanol or ethanol, to produce alkyl esters of the constituent fatty acids. The resulting alkyl esters may be hydrolyzed to the corresponding fatty acids if desired. The alkyl esters (or fatty acids) are conveniently hydroformylated by reaction with carbon monoxide and hydrogen. This introduces —CHO groups onto the fatty acid chain at the site of carbon-carbon unsaturation. Suitable hydroformylation methods are described in U.S. Pat. Nos. 4,731,486 and 4,633,021, for example, and in WO 04/096744. Some fatty acid groups contain multiple carbon-carbon double bond sites. In such cases, the hydroformylation reaction may not introduce —CHO groups at all of the double bond sites. A subsequent hydrogenation step converts the —CHO groups to hydroxymethyl (—$CH_2OH$) groups while hydrogenating residual carbon-carbon bonds to remove essentially all carbon-carbon unsaturation.

Hydroxymethyl-containing fatty acids made in the foregoing process tend to be a mixture of materials having no hydroxymethyl groups, and materials having 1, 2 or 3 hydroxymethyl groups. The proportion of materials having 2 and 3 hydroxymethyl groups is typically somewhat lower than the proportion of starting fatty acids (or alkyl esters) containing 2 and 3 carbon-carbon double bonds, as the hydroformylation reaction often does not take place across all the carbon-carbon double bonds unless stringent reaction conditions are used. Carbon-carbon double bonds that are not hydroformylated generally become hydrogenated. The ester group is an unsubstituted or inertly substituted alkyl corresponding to the alkanol used to conduct the tranesterification of the oil or fat material.

A preferred hydroxylmethyl group-containing fatty acid is 9(10)-hydroxymethylstearic acid (or methyl or ethyl ester thereof), which is formed by hydroformylating and hydrogenating oleic acid, or a fatty acid or ester mixture containing oleic acid (such as is prepared in the above-described transesterification reaction).

As before, the continuous phase may include one or more polyol materials in addition to the hydroxymethyl group-containing fatty acid or ester. Suitable such polyols include any of those described before, including the hydroxymethyl-containing polyester polyols described before. Preferably, the hydroxymethyl group-containing fatty acid or ester constitutes at least 50%, more preferably at least 70% and even more preferably at least 90% of the combined weight of the hydroxymethyl group-containing fatty acid or ester and additional polyol(s). It is not necessary to include any additional polyol(s) in the continuous phase.

These dispersions exhibit particularly good stability and low viscosities, particularly when the amount of additional polyol(s) is less than 20%, and most particularly when no additional polyol is present. It has been found that dispersions of the second aspect can be prepared with particularly high solids levels, such as from 40-65 wt-%, with good stability and good viscosity. A preferred stabilizer for use with the dispersion of the second aspect is a macromer formed from an 8,000 to 15,000 molecular weight polyether polyol, having introduced terminal ethylenic unsaturation and from 3-7 hydroxyl groups, or one formed by polymerizing up to 12% by weight of vinyl monomers, particularly styrene and/or acrylonitrile, in such a monomer.

The dispersion will generally be blended with at least one other polyol, polyamine or aminoalcohol for use in preparing a polyurethane, particularly when the hydroxyl functionality of the hydroxymethyl group-containing fatty acid or ester has an average functionality of less than two hydroxyl groups/molecule. The material with which the dispersion is suitably blended includes those described above, with the selection of particular material(s) and the relative amounts of those material(s) and dispersion being selected to obtain a desired average functionality and solids level in the blend. The terminal fatty acid or fatty acid ester group can react with hydroxyl or amine groups supplied by other components to build molecular weight and/or crosslink density, either during the polyurethane-forming reaction or in a subsequent curing step. This reaction generally will liberate water (in the case of a fatty acid group) or an alkanol.

Dispersions of the second type can be prepared with dispersed polyurea or polyurethane-urea particles, using processes analogous to those described above.

The polymer polyol and dispersions described before are useful to make a wide variety of polyurethane products. The polyurethane products will be in most instances elastomeric materials that may be non-cellular, microcellular or foam.

Polyurethanes are typically prepared by reacting the polymer polyol or dispersion with a polyisocyanate. The reaction is performed in the presence of a blowing agent or gas when a cellular product is desired. The reaction may be performed in a closed mold, but in some applications, such as slabstock foam, the reaction mixture is generally permitted to rise more or less freely to form a low density foam material. Generally, the polymer polyol and dispersion of the invention can be used in the same manner as conventional polyol and polymer polyol materials, using the same general types of processes as are used with the conventional materials.

Suitable polyisocyanates include aromatic, cycloaliphatic and aliphatic isocyanate. Exemplary polyisocyanates include m-phenylene diisocyanate, tolylene-2-4-diisocyanate, tolylene-2-6-diisocyanate, hexamethylene-1,6-diisocyanate, tetramethylene-1,4-diisocyanate, cyclohexane-1,4-diisocyanate, hexahydrotolylene diisocyanate, naphthylene-1,5-diisocyanate, 1,3- and/or 1,4-bis(isocyanatomethyl)cyclohexane (including cis- and/or trans isomers) methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), tolylene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, tolylene-2-4-diisocyanate, tolylene-2-6-diisocyanate or mixtures thereof. Diphenylmethane-4,4'-diisocyanate, diphenylmethane-2,4'-diisocyanate and mixtures thereof are generically referred to as MDI, and all can be used. Tolylene-2-4-diisocyanate, tolylene-2-6-diisocyanate and mixtures thereof are generically referred to as TDI, and all can be used.

The amount of polyisocyanate used in making polyurethane is commonly expressed in terms of isocyanate index, i.e. 100 times the ratio of NCO groups to isocyanate-reactive groups in the reaction mixture (including those provided by water if used as a blowing agent). In the production of conventional slabstock foam, the isocyanate index typically ranges from about 95-140, especially from about 105 to 115. In molded and high resiliency slabstock foam, the isocyanate index typically ranges from about 50 to about 150, especially from about 85 to about 110.

A catalyst is often used to promote the polyurethane-forming reaction. The selection of a particular catalyst package will vary somewhat with the particular application, the particular polymer polyol or dispersion that is used, and the other ingredients in the formulation. The catalyst may catalyze the "gelling" reaction between the polyol(s) and the polyisocyanate and/or, in many polyurethane foam formulation(s), the water/polyisocyanate (blowing) reaction which generates urea linkages and free carbon dioxide to expand the foam. In making water-blown foams, it is typical to use a mixture of at least one catalyst that favors the blowing reaction and at least one other that favors the gelling reaction. Formulations containing a high proportion of the hydroxymethyl-containing polyester polyol sometimes tend to form tighter foams than formulations mainly containing conventional polyether or polyester polyols. Accordingly, it may be preferred in such instances to use a reduced amount of gelling catalyst and an increased (relative to the amount of gelling catalyst) amount of blowing catalyst, as compared to similar foams made using conventional polyether polyols.

A wide variety of materials are known to catalyze polyurethane forming reactions, including tertiary amines, tertiary phosphines, various metal chelates, acid metal salts, strong bases, various metal alcoholates and phenolates and metal salts of organic acids. Catalysts of most importance are tertiary amine catalysts and organotin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, triethylenediamine and dimethylalkylamines where the alkyl group contains from 4 to 18 carbon atoms. Mixtures of these tertiary amine catalysts are often used. Examples of suitably commercially available catalysts include Niax™ A1 (bis(dimethylaminoethyl)ether in propylene glycol available from GE OSi Silicones), Niax™ B9 (N,N-dimethylpiperazine and N—N-dimethylhexadecylamine in a polyalkylene oxide polyol, available from GE OSi Silicones), Dabco™ 8264 (a mixture of bis(dimethylaminoethyl)ether, triethylenediamine and dimethylhydroxyethyl amine in dipropylene glycol, available from Air Products and Chemicals), and Dabco™ 33LV (triethylene diamine in dipropylene glycol, available from Air Products and Chemicals), Niax™ A-400 (a proprietary tertiary amine/carboxylic salt and bis(2-dimethylaminoethyl)ether in water and a proprietary hydroxyl compound, available from GE OSi Silicones); Niax™ A-300 (a proprietary tertiary amine/carboxylic salt and triethylenediamine in water, available from GE OSi Specialties Co.); Polycat™ 58 (a proprietary amine catalyst available from Air Products and Chemicals), Polycat™ 5 (pentamethyl diethylene triamine, available from Air Products and Chemicals) and Polycat™ 8 (N,N-dimethyl cyclohexylamine, available from Air Products and Chemicals).

Examples of organotin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Organotin catalysts are generally used in conjunction with one or more tertiary amine catalysts, if used at all. Organotin catalysts tend to be strong gelling catalysts, so they are preferably used in small amounts, especially in high resiliency foam formulations. Commercially available organotin catalysts of interest include Dabco™ T-9 and T-95 catalysts (both stannous octoate compositions available from Air Products and Chemicals).

Catalysts are typically used in small amounts, for example, each catalyst being employed from about 0.0015 to about 5% by weight of the high equivalent weight polyol.

When forming a foam, the reaction of the polyisocyanate and the polyol component is conducted in the presence of a blowing agent. Suitable blowing agents include physical blowing agents such as various low-boiling chlorofluorocarbons, fluorocarbons, hydrocarbons and the like. Fluorocarbons and hydrocarbons having low or zero global warming and ozone-depletion potentials are preferred among the physical blowing agents. Chemical blowing agents that decompose or react under the conditions of the polyurethane-forming reaction are also useful. By far the most preferred chemical blowing agent is water, which reacts with isocyanate groups to liberate carbon dioxide and form urea linkages. Water is preferably used as the sole blowing agent, in which case about 1 to about 7, especially from about 2.5 to about 5, parts by weight water are typically used per 100 parts by weight high equivalent weight polyol. Water may also be used in combination with a physical blowing agent, particularly a fluorocarbon or hydrocarbon blowing agent. In addition, a gas such as carbon dioxide, air, nitrogen or argon may be used as the blowing agent in a frothing process.

A surfactant is also used when a polyurethane foam is prepared. A wide variety of silicone surfactants as are commonly used in making polyurethane foams can be used in making the foams with the polymer polyols or dispersions of this invention. Examples of such silicone surfactants are commercially available under the tradenames Tegostab™ (Th. Goldschmidt and Co.), Niax™ (GE OSi Silicones) and Dabco™ (Air Products and Chemicals). A preferred type of silicone surfactant for slabstock foam formulations has a siloxane backbone containing a mixture of high atomic mass polyoxyalkylene pendant groups have an average atomic mass of from about 1400 to about 6000. The silicone backbone preferably also contains low atomic mass polyoxyalkylene pendant groups having an average atomic mass of from about 300 to about 750. It is more preferred that the silicone backbone contains both high and low atomic mass polyoxyalkylene pendant groups which, taken together, have an average atomic mass of from about 1000 to 2000, especially from 1100 to 1800. The silicon surfactant preferably contains from about 45 to 360, especially from about 90 to 260, silicone repeating units/molecule. Preferably, from about 6 to 30% of such silicon repeating units contain a pendant high or low atomic mass polyoxyalkylene group. Surfactants of these types are described, for example, in U.S. Pat. No. 5,145,879 and EP 0 712 884 B1. From about 1 to 6, preferably from about 2 to 4 parts by weight of such surfactants are suitably used per 100 parts by weight high equivalent weight polyols.

The preferred silicon surfactants for high water/high hydroxymethyl-containing polyester polyol slabstock foam applications can be represented by the formula $MD_xD'_yM$, wherein each M is independently $(CH_3)_3SiO_{1/2}$ or $R(CH_3)_2SiO_{1/2}$;
D is $(CHs)_2SiO_{1/2}$;
D' is $R(CH_3)SiO_{2/2}$;
x is 40-220, especially 85-220
y is 5-40, especially 8-40, with x/y<10; and
each R is independently a high atomic mass polyether group or a low atomic mass polyether group, provided that a sufficient number of R groups are high atomic mass polyether groups that the average atomic mass of all polyether groups is at least 1000, especially at least 1100. High atomic mass polyether groups R preferably have the structure $—(CH_2)_n(C_2H_4O)_a(CH_2CH(CH_3)O)_bR'$, in which n is about 3 to 10, a and b are such that ethylene oxide residues (i.e., $—C_2H_4O—$ groups) constitute from 30-100%, especially 30-50% by weight of the R group and the atomic mass of the R group is about 1400-6000, especially 3500-5000, and R' is hydrogen, alkyl, —C(O)R'', —C(O)OR'', or —C(O)NHR'', where R'' is a monofunctional alkyl or aryl group. Low atomic mass polyether groups R preferably have the structure $—(CH_2)_n(C_2H_4O)_a(CH_2CH(CH_3)O)_bR'$, in which n is about 3 to 10, a and b are such that that ethylene oxide residues constitute from 30 to 100% by weight of the R group, the atomic mass of the R group is from about 300 to 750, and R' is as defined before.

Those surfactants in which x and y are particularly high (such as an x value of 85 or more and a y value of 8 or more in the structure above) tend to have very high viscosities and therefore may mix poorly into the remaining components of the foam formulation. This problem can be overcome by thinning the surfactant with a diluent such as an aliphatic hydrocarbon, aromatic hydrocarbon, ethyoxylated phenol, alkylene benzene, polyether polyol, dipropylene glycol, and the like. Sufficient diluent is preferably used to bring the viscosity of the surfactant blend to below 3000 cP at 25° C.

Two silicone surfactants of particular interest in high water, high hydroxymethyl-containing polyester polyol slabstock foam formulations are Niax™ L-626 and Niax™ L-5614 surfactants, both available from GE OSi Silicones. These materials are high molecular weight silicone surfactant/diluent blends.

In addition to the foregoing components, the polyurethane formulation may contain various other optional ingredients such as cell openers; fillers such as calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; biocides; preservatives; antioxidants; flame retardants; and the like.

In general, a polyurethane foam is prepared by mixing the polyisocyanate and polymer polyol in the presence of the blowing agent, surfactant, catalyst(s) and other optional ingredients as desired, under conditions such that the polyisocyanate and polyol react to form a polyurethane and/or polyurea polymer while the blowing agent generates a gas that expands the reacting mixture. The foam may be formed by the so-called prepolymer method (as described in U.S. Pat. No. 4,390,645, for example), in which a stoichiometric excess of the polyisocyanate is first reacted with the high equivalent weight polyol(s) to form a prepolymer, which is in a second step reacted with a chain extender and/or water to form the desired foam. Frothing methods (as described in U.S. Pat. Nos. 3,755,212; 3,849,156 and 3,821,130, for example), are also suitable. So-called one-shot methods (such as described in U.S. Pat. No. 2,866,744) are preferred. In such one-shot methods, the polyisocyanate and all polyisocyanate-reactive components are simultaneously brought together and caused to react. Three widely used one-shot methods which are suitable for use in this invention include slabstock foam processes, high resiliency slabstock foam processes, and molded foam methods.

Slabstock foam is conveniently prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun. The resulting foams are typically from about 1 to about 5 pounds per cubic foot (pcf) (16-80 kg/m$^3$) in density, especially from about 1.2 to about 2.0 pcf (19.2-32 kg/m$^3$).

High resilience slabstock (HR slabstock) foam is made in methods similar to those used to make conventional slabstock foam. HR slabstock foams are characterized in exhibiting a rebound score of 55% or higher, per ASTM 3574.03. These foams tend to be prepared using somewhat higher catalyst levels, compared to conventional slabstock foams, to reduce energy requirements to cure the foam. HR slabstock foam formulations blown only with water tend to use lower levels of water than do conventional slabstock formulations and thus produce slightly higher density foams. Water levels tend to be from about 2 to about 3.5, especially from about 2.5 to about 3 parts per 100 parts high equivalent weight polyols. Foam densities are typically from about 2 to about 5 pcf (32-80 kg/m$^3$), especially from about 2.1 to about 3 pcf (33.6-48 kg/m$^3$).

Molded foam can be made according to the invention by transferring the reactants (polyol composition including the polymer polyol or dispersion of the invention, other polyols, polyisocyanate, blowing agent, and surfactant) to a closed mold where the foaming reaction takes place to produce a shaped foam. Either a so-called "cold-molding" process, in which the mold is not preheated significantly above ambient temperatures, or a "hot-molding" process, in which the mold is heated to drive the cure, can be used. Cold-molding processes are preferred to produce high resilience molded foam. Densities for molded foams tend to be in the range of from 2.0 to about 5.0 pounds per cubic foot (32-80 kg/m$^3$).

The polyols of the invention are also useful in malting foam via a mechanical frothing process. In such processes, air, nitrogen or other gas is whipped into a reacting mixture containing the high equivalent weight polyol(s), a polyisocyanate, and optionally catalysts, surfactants as described before, crosslinkers, chain extenders and other components. The frothed reaction mixture is then typically applied to a substrate where it is permitted to cure to form an adherent cellular layer. A frothing application of particular importance is the formation of carpet with an attached polyurethane cushion. Such carpet-backing processes are described, for example, in U.S. Pat. Nos. 6,372,810 and 5,908,701. Another frothing application is in the manufacture of microcellular elastomers, such as for shoe soles.

The polyurethane foam is useful as furniture cushioning, automotive seating, automotive dashboards, packaging applications, other cushioning and energy management applications, carpet backing, gasketing, and other applications for which conventional polyurethane foams are used.

The following examples are provided to illustrate the invention, but are not intended to limit the scope thereof. All parts and percentages are by weight unless otherwise indicated.

EXAMPLES 1-8

The following general procedure is used to make polymer polyol Examples 1-8:

A round bottom flask is equipped with an overhead stirrer, temperature controller, dropping funnel and reflux condenser. The hydroxylmethyl-containing polyester polyol and stabilizer (if any) are added to the flask and the head space is padded with nitrogen. The mixture is heated to 125° C. with stirring. A stream containing the monomers (styrene/acrylonitrile at a 70/30 weight ratio) and free radical initiator (AMBN) is fed to the reaction vessel over 2.5 hours while maintaining the content of the vessel at 125° C. The nominal solids content is 20% in all cases. The reaction mixture is then heated at 125° C. for another hour with agitation. Residual monomer content is determined, and the resulting polymer polyol is stripped to remove residual monomers and other volatiles.

The following hydroxymethyl-containing polyester polyols are used in Examples 1-8:

Hydroxymethyl-containing polyester polyol A (HMPP A) is the reaction product of a hydroxymethylated soybean oil and a 600 molecular weight, trifunctional poly(ethylene oxide). This material has a number average molecular weight of about 2400.

HMPP B is the reaction product of a hydroxymethylated soybean oil and a 600 molecular weight, trifunctional polypropylene) oxide. This material has a number average molecular weight of about 2000.

HMPP C is the reaction product of a hydroxymethylated soybean oil and a 600 molecular weight, trifunctional random copolymer of 87 wt-% propylene oxide and 143 wt-% ethylene oxide. This material has a number average molecular weight of about 2000.

The following stabilizers are used in Examples 1-8:

Stabilizer A is a 8,000-15,000 number average molecular weight polyether polyol having induced ethylenic unsaturation and free hydroxyl groups.

Stabilizer B is the reaction product of a 1:3 mole ratio of vinyl trimethoxy silane and a 3500 number average molecular weight polyether polyol.

Stabilizer C is the reaction product of equal parts by weight of Stabilizer B and HMPP C.

Stabilizer D is the reaction product of equal parts by weight Stabilizer B and HMPP B.

Raw materials and properties of the resulting dispersions are as described in Table 1 below.

TABLE 1

| Ingredient/ | Example No. | | | | | | | |
|---|---|---|---|---|---|---|---|---|
| Property | 1 | 2 | 3 | 4 | 5 | 6 | 7 | 8 |
| HMPP Type | A | A | A | A | A | C | C | B |
| Stabilizer Type | A | A | A | A | B | B | C | D |
| Wt-% stabilizer | 1 | 2 | 4 | 8 | 4 | 4 | 4 | 4 |
| Viscosity (mPa·s) | 6770 | 6990 | 7370 | 5140 | 7360 | 6580 | 6850 | 7130 |
| Particle size (µm) | 18.1 | 22.3 | 22.3 | 9.8 | 4.3 | 5.3 | 3.7 | 3.1 |
| Peak particle size, (µm) | 16.4 | 2.3 | 5.4 | 6.5 | 4.4 | 2.8 | 3.7 | 2.3 |
| Residual acrylonitrile, wt.-% | 2.0 | 1.2 | 1.2 | 1.0 | 0.9 | 0.0 | 0.7 | 0.0 |
| Residual styrene, wt.-% | 4.9 | 3.4 | 2.8 | 5.8 | 2.0 | 1.0 | 1.7 | 0.4 |

Good quality polymer polyols are made using a variety of stabilizers at varying levels.

EXAMPLES 9-12

The following general procedure is used to make dispersion Examples 9-12:

A reactor is preheated to 60° C. and charged with an initial charge of methylhydroxymethyl stearate (MHMS) and Stabilizer A. The reactor is then heated under vacuum to 125° C.

The vacuum valve is then closed, resulting in a pressure inside the reactor of about 0.1 bar. The comonomers (styrene and acrylonitrile at a 70/30 weight ratio) are mixed with additional MHMS, free radical initiator (AMBN) and dodecanethiol. This comonomer mixture is fed into the reactor over a period of 60-90 minutes while maintaining the reactor temperature at 125° C. After this comonomer blend addition is complete, a mixture of AMBN and MHMS is fed into the reactor over a 30 minute period. The reaction mixture is then held at 125° C. for an additional 30 minutes, cooled to 40° C., and stored. A sample is taken for free monomer analysis and filtration. The remainder is stripped to remove residual monomers and then further analyzed. Results are as indicated in Table 2.

TABLE 2

| Ingredient/Property | Example No. | | | |
|---|---|---|---|---|
| | 9 | 10 | 11 | 12 |
| Initial Charge, parts | | | | |
| Stabilizer A | 64 | 73.56 | 80.92 | 88.28 |
| MHMS | 146.49 | 120.57 | 100.62 | 86.92 |
| Comonomer blend | | | | |
| Styrene | 243.6 | 280 | 308 | 336 |
| Acrylonitrile | 104.4 | 120 | 132 | 144 |
| AMBN | 1.41 | 1.62 | 1.78 | 1.94 |
| Dodecanethiol | 3.52 | 4.05 | 4.46 | 4.87 |
| MHMS | 205.49 | 169.13 | 141.15 | 121.92 |
| Post-monomer blend | | | | |
| AMBN | 1.07 | 1.07 | 1.07 | 1.07 |
| MHMS | 30 | 30 | 30 | 30 |
| Nominal Solids, % | 43.5 | 50 | 55 | 60 |
| Residual Styrene, wt.-% | 0.38 | 0.22 | 0.26 | 0.48 |
| Residual Acrylonitrile, wt.-% | 0.55 | 0.44 | 0.3 | 0.66 |
| Filterability, 35 μm, 300 seconds, % | 100 | 100 | 100 | 100 |
| Viscosity, 25° C., Cone/cup 100 s$^{-1}$, mPa · s | 1000 | 5000 | 10,000 | 34,000 |
| Particle size D[4, 3] | 2.27 | 1.7 | 1.32 | 1.35 |

Polyurethane foams are prepared using dispersion Example 10 in a the formulation as set out in Table 3.

TABLE 3

| Ingredient | Parts By Weight | |
|---|---|---|
| EO-capped Polyether polyol | 18.75 | 0 |
| Dispersion of Example 10 | 18.75 | 37.5 |
| Polyether polyol | 62.5 | 62.5 |
| Diethanol amine | 1.6 | 1.6 |
| Amine catalyst | 0.35 | 0.35 |
| Organotin catalyst | 0.08 | 0.08 |
| Water | 4.2 | 4.2 |
| Surfactant | 1.2 | 1.2 |

Both formulations foam well to form good quality polyurethane foam. Physical properties of the foams are measured and are as reported in Table 4. Compression sets, resiliency, tear strength, tensile strength, elongation, modulus, density and airflow are measured according to ASTM D379495. Mean load at 65% deflection is measured according to ISO 243-97.

TABLE 4

| Property | Value | |
|---|---|---|
| 50% Compression Set, % | 16 | 41 |
| 50% Humid Age Compression Set, % | 32 | 41 |
| 75% Compression Set, % | 62 | 72 |
| 75% Humid Age Compression Set, % | 56 | 66 |
| Resiliency, % | 38 | 29 |
| Elongation at Break, % | 60 | 58 |
| Tear Strength lb/in (N/m) | 1.60 (28.6) | 1.50 (26.8) |
| Tensile Strength, psi (kPa) | 15 (103) | 13 (90) |
| Mean Load at 65% Deflection, lb (N) | 121 (538) | 125 (556) |
| Mean Modulus | 3 | 3 |
| Hysteresis, % | 67 | 50 |
| Density, pcf (kg/m$^3$) | 1.9 (30.4) | 2.1 (33.2) |
| Airflow, ft$^3$/min (L/s) | 1.29 (0.61) | 1.18 (0.56) |

What is claimed is:

1. A polymer polyol having a polyol continuous phase and dispersed polymer particles, wherein the polyol continuous phase includes at least one hydroxymethyl-containing polyester polyol derived from a fatty acid or ester of a fatty acid, wherein the dispersed polymer particles comprises polyurea polymer particles or polyurethane-urea particles formed in the presence of the at least one hydroxymethyl-containing polyester polyol derived from a fatty acid or ester of a fatty acid, and wherein the hydroxymethyl group-containing polyester polyol has the following structure:

$$[H-X]_{z-p}-R-[X-Z]_p \quad (I)$$

wherein R is the residue of an initiator compound having z hydroxyl and/or primary or secondary amine groups, where z is at least two; each X is independently —O—, —NH— or —NR'— in which R' is an inertly substitute alkyl, aryl, cycloalkyl, or aralkyl group, p is a number from 1 to z representing the average number of [X—Z] groups per hydroxymethyl-containing polyester polyol molecule, Z is a linear or branched chain containing one or more A groups, provided that the average number of A groups per molecule is >=1.3 times z, and each A is independently selected from the group consisting of A1, A2, A3, A4 and A5, provided that at least some A groups are A1, A2 and A3, and provided that A1 has a molar ratio of between about 30 and about 80 mole-% of the total mole-% of A1+A2+A3, A2 has a molar ratio of between about 10 and about 60 mole-% of the total mole-% of A1+A2+A3, A3 has a molar ratio of between about 0.1 and about 10 mole-% of the total mole-% of A1+A2+A3, wherein A1 is:

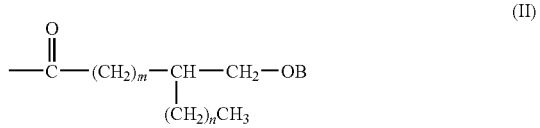

(II)

wherein B is H or a covalent bond to a carbonyl carbon atom of another A group; m is number greater than 3, n is greater than or equal to zero and m+n is from 11 to 19; A2 is:

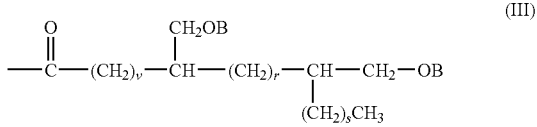

(III)

wherein B is as before, v is a number greater than 3, r and s are each numbers greater than or equal to zero with v+r+s being from 10 to 18, A3 is:

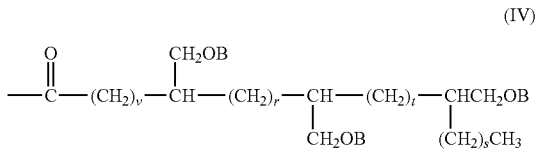

(IV)

wherein B, v, each r and s are as defined before, t is a number greater than or equal to zero, and the sum of v, r, s and t is from 10 to 18; A4 is

(V)

where w is from 10-24, and A5 is

(VI)

where R' is a linear or branched alkyl group that is substitute with at least one cyclic ether group and optionally one or more hydroxyl groups or other ether groups.

2. The polymer polyol of claim 1, wherein the hydroxymethyl-containing polyester polyol is prepared by reacting a hydroxymethyl group-containing fatty acid having from 12 to 26 carbon atoms, or an ester of such a hydroxymethyl group-containing fatty acid, with a polyol or polyamine initiator compound having an average of at least 2 hydroxyl, primary amine and/or secondary amine groups, such that the hydroxymethyl-containing polyester polyol contains an average of at least 1.3 repeating units derived from the hydroxymethyl-group-containing fatty acid or ester per total number of hydroxyl, primary amine and secondary amine groups in the initiator compound, and the hydroxymethyl-containing polyester polyol has an equivalent weight of at least 400 up to 15,000.

3. The polymer polyol of claim 1 or 2, wherein the equivalent weight of the hydroxymethyl-containing polyester polyol is from 700 to 3500.

4. The polymer polyol of claim 1, wherein the hydroxymethyl-containing polyester polyol contains an average of 2 to 5 hydroxyl, primary amine or secondary amine groups per molecule.

5. The polymer polyol of claim 1, wherein the hydroxymethyl group-containing polyester polyol has an average of from 3 to 4 hydroxyl groups per molecule and an equivalent weight per hydroxyl group of from 500 to 1000.

6. The polymer polyol of claim 1, wherein the hydroxymethyl group-containing polyester polyol constitutes from 50 to 100% by weight of the polyol continuous phase.

7. A polyurethane polymer made by reacting the polymer polyol of claim 1 with a polyisocyanate.

8. The polyurethane polymer of claim 7, which is cellular.

9. The polyurethane polymer of claim 7, which is a slabstock flexible foam.

10. The polyurethane polymer of claim 9, which is a molded flexible foam.

* * * * *